US011256553B2

(12) United States Patent
Janakiraman et al.

(10) Patent No.: US 11,256,553 B2
(45) Date of Patent: Feb. 22, 2022

(54) INTELLIGENT SYSTEM TO PRIORITIZE SERVERS FOR ENVISAGED REQUESTS

(71) Applicant: EMC IP HOLDING COMPANY LLC, Hopkinton, MA (US)

(72) Inventors: Tamilarasan Janakiraman, Hosur (IN); Kannan Subbaraman, Bangalore (IN); Sivaram Selvam, Bangalore (IN); Mark Arakelian, Shirley, MA (US); Debra Robitaille, Hopkinton, MA (US)

(73) Assignee: Dell Products L.P., Hopkinton, MA (US)

( * ) Notice: Subject to any disclaimer, the term of this patent is extended or adjusted under 35 U.S.C. 154(b) by 18 days.

(21) Appl. No.: 16/812,897

(22) Filed: Mar. 9, 2020

(65) Prior Publication Data

US 2021/0279112 A1 Sep. 9, 2021

(51) Int. Cl.
*G06F 9/50* (2006.01)
*H04L 12/26* (2006.01)
*H04L 29/08* (2006.01)
*G06F 9/48* (2006.01)
*H04L 43/08* (2022.01)
*H04L 67/1001* (2022.01)

(52) U.S. Cl.
CPC .......... *G06F 9/5083* (2013.01); *G06F 9/4881* (2013.01); *G06F 9/5038* (2013.01); *H04L 43/08* (2013.01); *H04L 67/1002* (2013.01)

(58) Field of Classification Search
CPC ..... G06F 9/5038; G06F 9/4881; H04L 43/08; H04L 67/1002
See application file for complete search history.

(56) References Cited

U.S. PATENT DOCUMENTS

| 2014/0164612 | A1* | 6/2014 | Hillier | H04L 41/147 709/224 |
| 2021/0109830 | A1* | 4/2021 | Venugopal | H04L 67/10 |

* cited by examiner

*Primary Examiner* — Sisley N Kim
(74) *Attorney, Agent, or Firm* — Anderson Gorecki LLP

(57) ABSTRACT

A workload manager uses on-band and off-band metrics to select a host server in a cluster to handle a connection request. The on-band metrics include CPU usage, memory usage, and vulnerability metrics. The off-band metrics include hardware component error logs. Utilization and vulnerability scores are calculated for each host server from the on-band metrics. A reliability score is calculated for each host server from the off-band metrics. A health score for each host server is calculated from the vulnerability and reliability scores. The health score is used to exclude unhealthy host servers from consideration. A priority score is calculated for each host server from the utilization, vulnerability, and reliability scores. The host server that has not been excluded and has the greatest priority score is selected to handle the connection request.

14 Claims, 5 Drawing Sheets

|  | R | U | V | P | H |
|---|---|---|---|---|---|
| Host 114 | 80% | 75% | 80% | 235 | 80 |
| Host 112 | 82% | 93% | 52% | 227 | 67 |
| Host 110 | 77% | 66% | 59% | 202 | 68 |

Figure 3

| Time | CPU Logs(iDRAC) | Memory Logs(iDRAC) | Reliability Score | CPU Performance | Memory Performance | Utilization Score |
|---|---|---|---|---|---|---|
| 1st Hour | Total Critical Error :1 | Total Critical Error :1 | 75% | 80% | 75% | 80% |
| 2nd Hour | Total Critical Error :1 | Total Critical Error :1 | 75% | 65% | 55% | 65% |
| 3rd Hour | Total Critical Error :2 | Total Critical Error :2 | 65% | 75% | 35% | 75% |
| 4th Hour | Total Critical Error :2 | Total Critical Error :2 | 65% | 90% | 77% | 95% |
| 5th Hour | Total Critical Error :2 | Total Critical Error :2 | 65% | 80% | 45% | 80% |

Figure 4

INTELLIGENT SYSTEM TO PRIORITIZE SERVERS FOR ENVISAGED REQUESTS

TECHNICAL FIELD

The subject matter of this disclosure is generally related to server clusters, and more particularly to assigning individual connection requests to individual servers in a cluster.

BACKGROUND

A data center for a large organization may include one or more clusters of host servers that run instances of host applications. Examples of host applications may include, but are not limited to, software for email, inventory control, accounting, manufacturing, and a wide variety of other organizational functions. Each host server may support multiple instances of the same host application. A load balancing server or switch may be used to assign connection requests from client computers to individual host servers. For example, connection requests may be assigned to the server that has the most available memory and storage space.

SUMMARY

All examples, aspects and features mentioned in this document can be combined in any technically possible way.

An apparatus in accordance with some implementations comprises a load balancer comprising: a processor; memory; and a workload manager that collects on-band metrics and off-band metrics from each of a plurality of host servers of a cluster, calculates at least one score for each of the host servers based on the on-band metrics and off-band metrics collected from that host servers, and assigns a connection request to a selected one of the host servers based on a comparison of the scores of the host servers. In some implementations the on-band metrics comprise CPU usage, memory usage, and vulnerability metrics. In some implementations the off-band metrics comprise hardware component error logs. In some implementations the workload manager calculates a utilization score for each of the host servers based on CPU usage and memory usage. In some implementations the workload manager calculates a vulnerability score for each of the host servers based on the vulnerability metrics using a cumulative common vulnerability scoring system. In some implementations the workload manager calculates a reliability score for each of the host servers based on relative number of critical errors as indicated in the logs. In some implementations the workload manager calculates a health score for each of the host servers based on the vulnerability score and the reliability score. In some implementations the workload manager calculates a priority score for each of the host servers based on the vulnerability score and the utilization score. In some implementations the workload manager excludes from consideration ones of the host servers based on the health scores. In some implementations the workload manager assigns the connection request to the host server based on the priority scores.

A method in accordance with some implementations comprises: collecting on-band metrics and off-band metrics from each of a plurality of host servers of a cluster; calculating at least one score for each of the host servers based on the on-band metrics and off-band metrics collected from that host servers; and assigning a connection request to a selected one of the host servers based on a comparison of the scores of the host servers. In some implementations the on-band metrics comprise CPU usage, memory usage, and vulnerability metrics, and the method comprises calculating a utilization score for each of the host servers based on CPU usage and memory usage. Some implementations comprise calculating a vulnerability score for each of the host servers based on the vulnerability metrics using a cumulative common vulnerability scoring system. In some implementations the off-band metrics comprise hardware component error logs and the method comprises calculating a reliability score for each of the host servers based on relative number of critical errors as indicated in the logs. Some implementations comprise calculating a health score for each of the host servers based on the vulnerability score and the reliability score. Some implementations comprise calculating a priority score for each of the host servers based on the vulnerability score and the utilization score. Some implementations comprise excluding from consideration ones of the host servers based on the health scores. Some implementations comprise assigning the connection request to the host server based on the priority scores.

Some implementations comprise a computer-readable storage medium storing instructions that when executed by a computer cause the computer to perform a method for using a computer system to assign a connection request to a selected host server in a cluster of host servers, the method comprising: collecting on-band metrics from each host server of the cluster, wherein the on-band metrics comprise CPU usage, memory usage, and vulnerability metrics; collecting off-band metrics from each host server of the cluster, wherein the off-band metrics comprise hardware component error logs; calculating a utilization score for each of the host servers based on CPU usage and memory usage; calculating a vulnerability score for each of the host servers based on the vulnerability metrics using a cumulative common vulnerability scoring system; calculating a priority score for each of the host servers based on the vulnerability score and the utilization score; and selecting the host server to which the connection request is assigned based on the priority scores. In some implementations the method further comprises calculating a reliability score for each of the host servers based on relative number of critical errors as indicated in the logs, calculating a health score for each of the host servers based on the vulnerability score and the reliability score, and excluding from consideration ones of the host servers based on the health scores.

Other aspects, features, and implementations may become apparent in view of the detailed description and figures.

BRIEF DESCRIPTION OF THE FIGURES

FIG. 3 illustrates a table of reliability, utilization, vulnerability, priority, and health scores for each of the host servers in the cluster.

FIG. 4 illustrates on-band metrics, off-band metrics, and associated scores changing over time.

DETAILED DESCRIPTION

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Aspects of the inventive concepts are described as being implemented in a data storage system that includes host servers and a storage area network (SAN). Such implementations should not be viewed as limiting. Those of ordinary skill in the art will recognize that there are a wide variety of implementations of the inventive concepts in view of the teachings of the present disclosure. Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
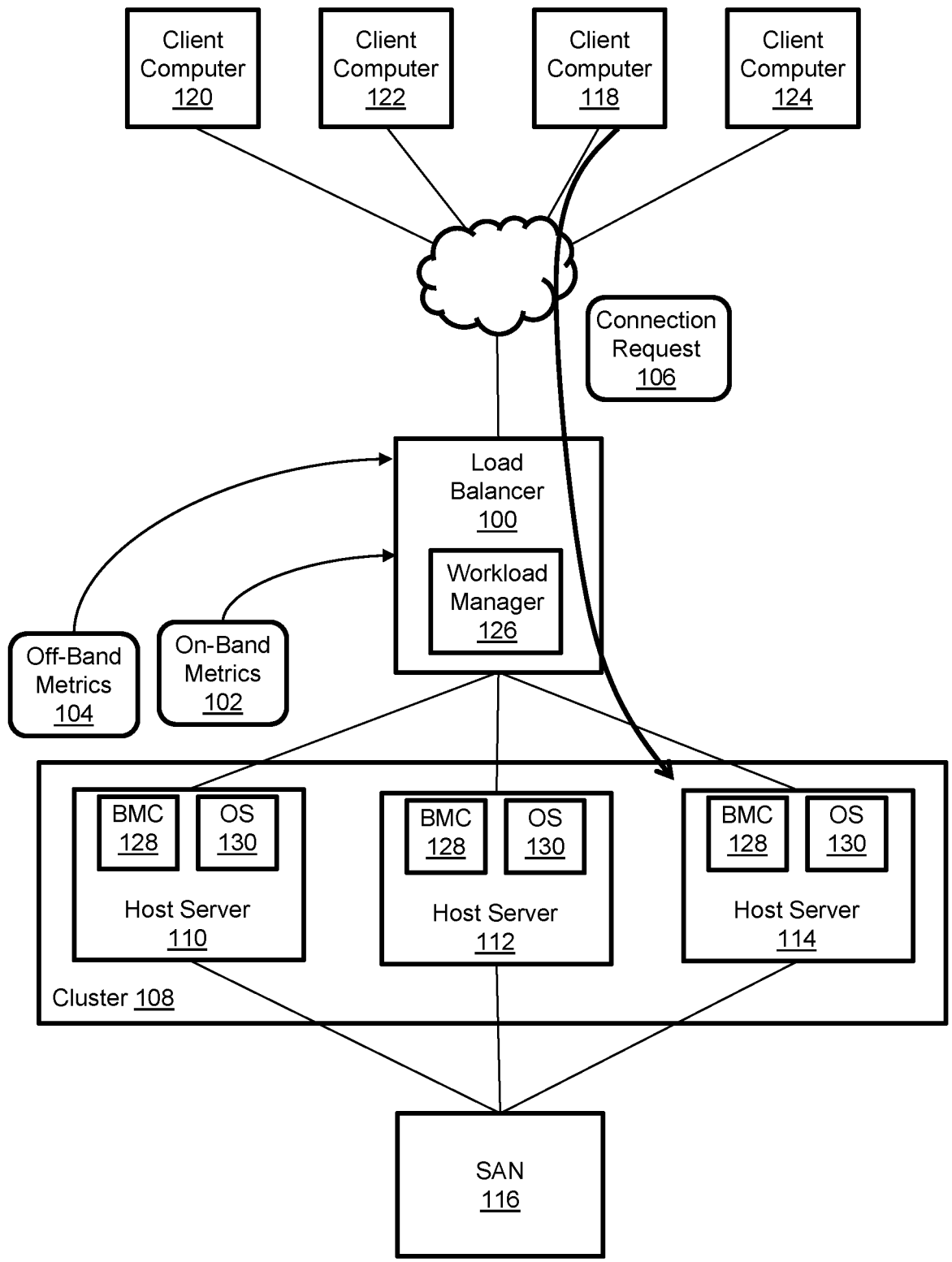
FIG. 1 illustrates a data center in which a load balancer uses on-band metrics and off-band metrics to assign requests to individual host servers based on calculated scores.

FIG. 1 illustrates a data center in which a load balancer 100 uses on-band metrics 102 and off-band metrics 104 to assign a connection request 106 to an individual host server 114 of a server cluster 108 based on calculated scores. The simplified server cluster 108 includes three host servers 110, 112, 114. The host servers use application data that is maintained by a storage area network (SAN) 116. The host servers run instances of host applications that might include, but are not limited to, one or more of software for email, inventory control, accounting, manufacturing, and a wide variety of other organizational functions. Each host server may support multiple instances of the same host application. The host applications may perform various functions in response to communications received from client computers via a network. For example, a client computer 118 might generate connection request 106 to obtain an accounting report, in response to which an accounting application running on host server 114 might obtain host application data from the SAN 116, use the data to generate the report, and return the report to the client computer 118. The other client computers 120, 122, 124 also generate connection requests that are assigned to host servers by the load balancer 100. The host servers may be undiscoverable by the client computers. The load balancer 100, which may be a server or switch, performs address translations that hide the identity of the host server to which the connection request from the client computer has been assigned. Each client computer, host server, load balancer and SAN includes processor resources such as central processing units (CPUs) and graphics processing units (GPUs), non-volatile storage such as hard disk drives (HDDs) and solid-state drives (SSDs), and volatile memory such as random-access memory (RAM) of any type.

The load balancer 100 includes a workload manager 126 that calculates scores for assigning individual connection requests from individual client computers to individual host servers. The workload manager uses both the on-band metrics 102 and off-band metrics 104 collected from each host server to calculate the scores. Each host server includes a baseboard management controller (BMC) 128 and an operating system (OS) 130. The BMCs are specialized service processors that monitor the physical state of the associated server using log data and sensors. The sensors measure off-band metrics such as temperature, humidity, power-supply voltage, and fan speeds. The logs include hardware and component logs such as network card, CPU, RAM, and other hardware component error severity logs. The OSs provide on-band metrics such as CPU usage, RAM usage, and vulnerability metrics. The workload manager uses selected on-band metrics and off-band metrics to calculate scores for each host server. Connection requests from client computers are assigned to host servers based on the scores calculated by the workload manager.

Figure 2:
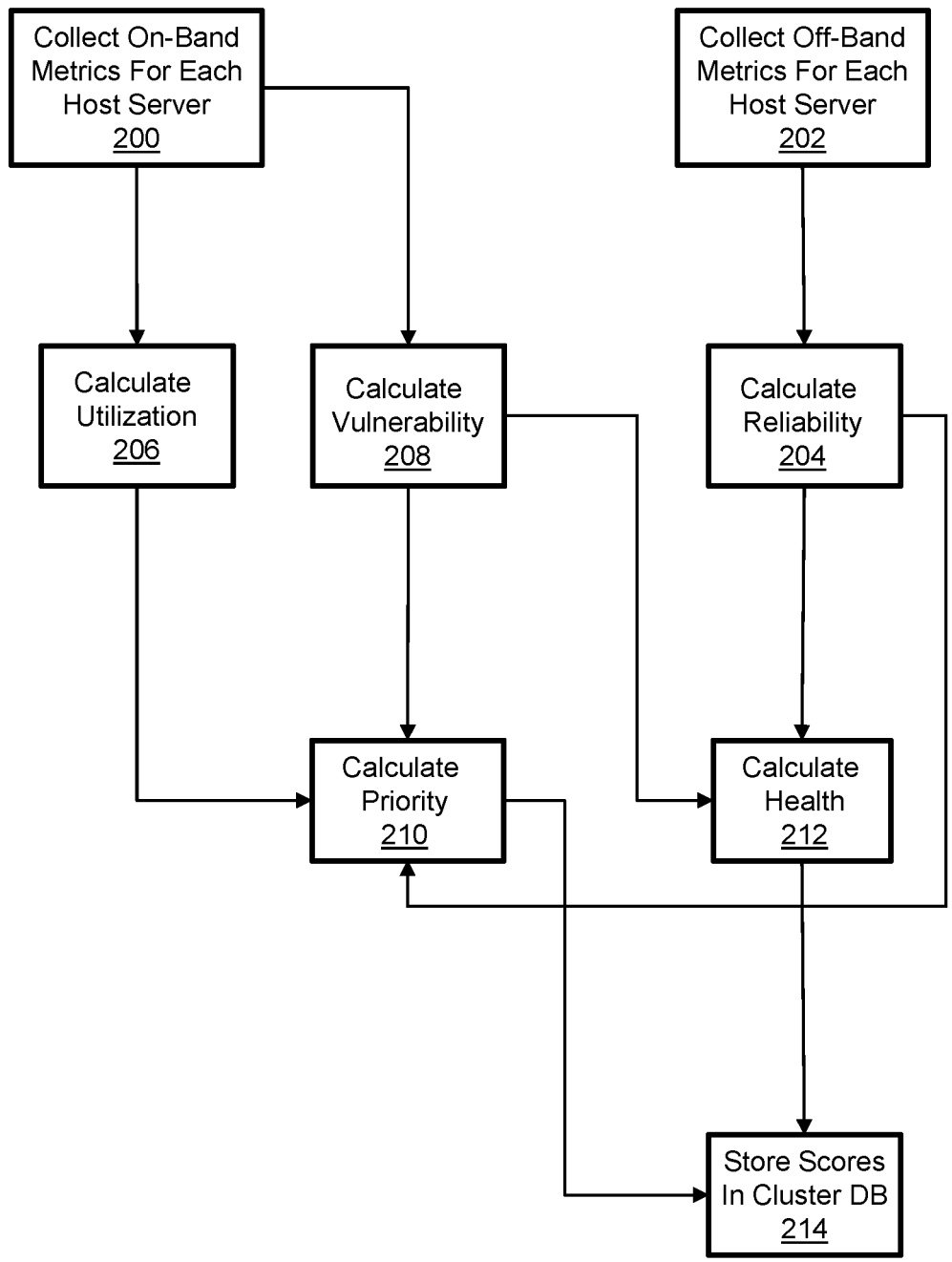
FIG. 2 illustrates the score calculations in greater detail.

FIG. 2 illustrates calculation of the scores by the workload manager in greater detail. The on-band metrics 102 (FIG. 1) are collected from each host server as indicated in step 200. The off-band metrics 104 (FIG. 1) for each host server are collected as indicated in step 202. The off-band metrics are used to calculate reliability scores for each host server as indicated in step 204. The reliability score is represented as a value such as a percentage calculated from collected BMC logs that indicate CPU and RAM/DIMM errors. Errors categorized as high and critical severity are used in the reliability score calculation. For example, a reliability score (R) may be calculated as:

$$R = 100 * \frac{\text{Total No. of Logs with Uniq(High) and Uniq(Critical)}}{\text{Total No. of Components}} - 100$$

The on-band metrics are used to calculate utilization and vulnerability scores as indicated in steps 206 and 208. The utilization score is represented as a value such as a percentage calculated from collected CPU and RAM usage. For example, a utilization score (U) may be calculated as ((100−pCpuUsage)+(100−pMemUsage))/2, where pCpuUsage is the percentage of CPU usage and pMemUsage is the percentage of RAM usage. The vulnerability score is represented as a value such as a percentage calculated from collected vulnerability metrics. For example, a vulnerability score (V) may be calculated as 1−(cvss_high+cvss_critical)/cvss_cum, where cvss_cum is the cumulative common vulnerability scoring system (CVSS) value of vulnerability ratings and cvss_high and cvss_critical are High and Critical ratings. CVSS is an open framework for communicating the characteristics and severity of software vulnerabilities. CVSS has three metric groups: base, temporal, and environmental. The base metrics produce a score ranging from 0 to 10 with the High and Critical ratings corresponding to CVSS scores of 7.0-8.9 and 9.0-10.0 respectively as shown below.

| Rating | CVSS Score |
| --- | --- |
| None | 0.0 |
| Low | 0.1-3.9 |
| Medium | 4.0-6.9 |
| High | 7.0-8.9 |
| Critical | 9.0-10.0 |

The National Vulnerability Database (NVD) provides CVSS scores for most known vulnerabilities.

A priority score is calculated from the utilization score and the vulnerability score as indicated in step 210. For example, a priority score (P) may be calculated as (Wtu*U)+(Wtr*R)+(Wtv*V), where Wtu, Wtr, and Wtv are weights. A health score is calculated from the vulnerability score and the reliability score as indicated in step 212. For example, a health score (H) may be calculated as (R+V)/2. The priority and health scores for each host server of the cluster are stored in a cluster database as indicated in step 214.

FIG. 3 illustrates a table of reliability scores R, utilization scores U, vulnerability scores V, priority scores P, and health scores H for each of the host servers in the cluster. The illustrated table is an example of a wide variety of data structures that may be used to store scores in the cluster database. Host 114 has the greatest priority score, i.e. 235 compared with 227 and 202, and is therefore selected for the connection request as shown in FIG. 1. Hosts 110, 112 might be excluded from consideration of their respective health scores of 68 and 67 are below a predetermined threshold.

FIG. 4 illustrates on-band metrics, off-band metrics, and associated scores changing over time. The number of total critical errors in the CPU logs and memory logs increases between the second and third hours. As a result, the reliability score R decreases from 75% to 65%. Also shown is a change in the utilization score U based on changes in CPU usage (performance) and memory usage (performance). Records of score changes collected over time may be timestamped and maintained in the cluster database. The timestamped records may be used by a timeseries forecasting machine learning model to predict future scores based on which the workload manager assign workloads to respective host servers.

Figure 5:
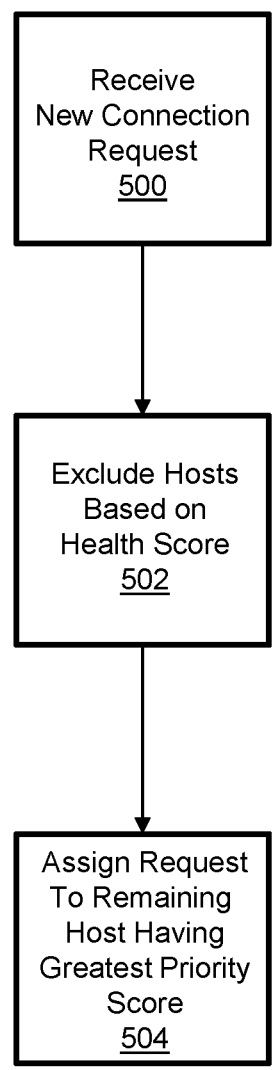
FIG. 5 illustrates assigning requests to individual host servers based on health scores and priority scores.

FIG. 5 illustrates assigning requests to individual host servers based on health scores and priority scores. A new connection request is received as indicated in step 500. Hosts that currently have a health score that is lower than a predetermined threshold are excluded from consideration as indicated in step 502. The remaining host server having the highest priority score is selected as indicated in step 504. The new connection request is assigned to the selected host server.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
a load balancer comprising:
memory; and
a workload manager processor that:
collects on-band metrics comprising CPU usage, memory usage, and cumulative common vulnerability scoring system vulnerability metrics from each of a plurality of host servers of a cluster;
collects off-band metrics comprising hardware component error logs from each of the host servers of the cluster;
calculates a utilization score U for each of the host servers based on the CPU usage and the memory usage;
calculates a vulnerability score V for each of the host servers based on the vulnerability metrics;
calculates a reliability score R for each of the host servers based on critical errors indicated in the hardware component error logs;
calculates a priority score P for each of the host servers based on weighted calculated values of U, V, and P;
calculates a health score H for each of the host servers based on calculated values of V and R; and
responsive to receipt of a new connection request:
excludes from consideration ones of the host servers for which H fails to meet a predetermined threshold; and
assigns the connection request to one of the host servers that is not excluded from consideration and has a better score P than other ones of the host servers.

2. The apparatus of claim 1 wherein the workload manager calculates the utilization score U=((100−pCpuUsage)+(100−pMemUsage))/2, where pCpuUsage is percentage of CPU usage and pMemUsage is percentage of memory usage.

3. The apparatus of claim 1 wherein the workload manager calculates the vulnerability score V=1−(cvss_high+cvss_critical)/cvss_cum, where cvss_cum is the cumulative common vulnerability scoring system value and cvss_high and cvss_critical are High and Critical ratings, respectively.

4. The apparatus of claim 1 wherein the workload manager calculates the reliability score $$R = 100 * \frac{\text{Total No. of Logs with } Uniq \text{ (High) and } Uniq \text{ (Critical)}}{\text{Total No. of Components}} - 100$$

5. The apparatus of claim 1 wherein the workload manager calculates the health score H=(R+V)/2.

6. The apparatus of claim 1 wherein the workload manager calculates the priority score P=(Wtu*U)+(Wtr*R)+(Wtv*V), where Wtu, Wtr, and Wtv are weights.

7. A method comprising:
collecting on-band metrics comprising CPU usage, memory usage, and cumulative common vulnerability scoring system vulnerability metrics from each of a plurality of host servers of a cluster;
collecting off-band metrics comprising hardware component error logs from each of the host servers of the cluster;
calculating a utilization score U for each of the host servers based on the CPU usage and the memory usage;

calculating a vulnerability score V for each of the host servers based on the vulnerability metrics;

calculating a reliability score R for each of the host servers based on critical errors indicated in the hardware component error logs;

calculating a priority score P for each of the host servers based on weighted calculated values of U, V, and P;

calculating a health score H for each of the host servers based on calculated values of V and R; and responsive to receipt of a new connection request:
excluding from consideration ones of the host servers for which H fails to meet a predetermined threshold; and
assigning the connection request to one of the host servers that is not excluded from consideration and has a better score P than other ones of the host servers.

8. The method of claim 7 comprising calculating the utilization score U=((100−pCpuUsage)+(100−pMemUsage))/2, where pCpuUsage is percentage of CPU usage and pMemUsage is percentage of memory usage.

9. The method of claim 7 comprising calculating the vulnerability score V=1−(cvss_high+cvss_critical)/cvss_cum, where cvss_cum is the cumulative common vulnerability scoring system value and cvss_high and cvss_critical are High and Critical ratings, respectively.

10. The method of claim 7 comprising calculating the reliability score $$R = 100 * \frac{\text{Total No. of Logs with } Uniq \text{ (High) and } Uniq \text{ (Critical)}}{\text{Total No. of Components}} - 100$$

11. The method of claim 7 comprising calculating the health score H=(R+V)/2.

12. The method of claim 7 comprising calculating the priority score P=(Wtu*U)+(Wtr*R)+(Wtv*V), where Wtu, Wtr, and Wtv are weights.

13. A non-transitory computer-readable storage medium storing instructions that when executed by a computer cause the computer to perform a method for using a computer system to assign a connection request to a selected host server in a cluster of host servers, the method comprising:

collecting on-band metrics from each host server of the cluster, wherein the on-band metrics comprise CPU usage, memory usage, and cumulative common vulnerability scoring system vulnerability metrics; collecting off-band metrics from each host server of the cluster, wherein the off-band metrics comprise hardware component error logs; calculating a utilization score U for each of the host servers based on CPU usage and memory usage; calculating a vulnerability score V for each of the host servers based on the vulnerability metrics using the cumulative common vulnerability scoring system; calculating a reliability score R for each of the host servers based on critical errors indicated in the hardware component error logs; calculating a priority score P for each of the host servers based on weighted calculated values of U, V, and P; calculating a health score H for each of the host servers based on calculated values of V and R; and responsive to receipt of a new connection request: excluding from consideration ones of the host servers for which H fails to meet a predetermined threshold; and assigning the connection request to one of the host servers that is not excluded from consideration and has a better score P than other ones of the host servers.

14. The non-transitory computer-readable storage medium of claim 13 wherein the method further comprises:
calculating the utilization score U=((100−pCpuUsage)+(100−pMemUsage))/2, where pCpuUsage is percentage of CPU usage and pMemUsage is percentage of memory usage;
calculating the vulnerability score V=1−(cvss_high+cvss_critical)/cvss_cum, where cvss_cum is the cumulative common vulnerability scoring system value and cvss_high and cvss_critical are High and Critical ratings, respectively;
calculating the reliability score $$R = 100 * \frac{\text{Total No. of Logs with } Uniq \text{ (High) and } Uniq \text{ (Critical)}}{\text{Total No. of Components}} - 100$$

calculating the health score H=(R+V)/2; and
calculating the priority score P=(Wtu*U)+(Wtr*R)+(Wtv*V), where Wtu, Wtr, and Wtv are weights.

* * * * *